United States Patent [19]
Takahashi et al.

[11] Patent Number: 5,194,479
[45] Date of Patent: Mar. 16, 1993

[54] SILICONE RUBBER COMPOSITION AND ITS MANUFACTURE

[75] Inventors: Masaharu Takahashi; Tsutomu Nakamura; Naoki Omura, all of Annaka, Japan

[73] Assignee: Shin-Etsu Chemical Co., Ltd., Tokyo, Japan

[21] Appl. No.: 676,437

[22] Filed: Mar. 28, 1991

[30] Foreign Application Priority Data

Mar. 29, 1990 [JP] Japan ................................ 2-81831

[51] Int. Cl.$^5$ ............................................. C08K 3/00
[52] U.S. Cl. .................................. 524/401; 524/588; 524/422
[58] Field of Search ............... 524/861, 863, 588, 422, 524/401

[56] References Cited

U.S. PATENT DOCUMENTS

| | | | |
|---|---|---|---|
| 3,671,546 | 6/1972 | Karstedt et al. | 524/588 |
| 4,045,390 | 8/1977 | Itoh et al. | 524/267 |
| 4,431,771 | 2/1984 | Falender et al. | 524/588 |
| 4,463,108 | 7/1984 | Wagner et al. | 524/588 |
| 4,690,967 | 9/1987 | La Garde et al. | 524/266 |
| 4,761,447 | 8/1988 | Shen et al. | 524/860 |
| 4,929,669 | 5/1990 | Jensen | 524/861 |
| 4,978,710 | 12/1990 | Liles | 524/861 |
| 4,988,758 | 1/1991 | Fukuda et al. | 524/588 |

FOREIGN PATENT DOCUMENTS 958570 5/1964 United Kingdom .

Primary Examiner—Melvyn I. Marquis
Assistant Examiner—Karen A. Dean
Attorney, Agent, or Firm—Nixon & Vanderhye

[57] ABSTRACT

A silicone rubber composition comprising: (A) a diorganopolysiloxane, (B) a reinforcing filler, (C) an acid strength adjustor, and (D) a curing agent, wherein the extract water pH is in the range of 3.0 to 5.5, said extract water pH being defined in such a way that when 50 g of a toluene solution containing 5.0% by weight of said rubber composition is subjected to extraction with 10 g of deionized water, the pH of the resulting water is defined as the extract water pH. The cured product of said composition is good in extension fatigue resistance and flex fatigue resistance.

9 Claims, 1 Drawing Sheet

SILICONE RUBBER COMPOSITION AND ITS MANUFACTURE

BACKGROUND OF THE INVENTION

1. Field of the Invention

The present invention relates to silicone rubber compositions whose cured product is improved in flex fatigue resistance and extension fatigue resistance, a process for the production thereof, and their cured product.

2. Description of Prior Art

Since silicone rubbers are excellent, for example, in electrical resistance, heat resistance, cold resistance, weather resistance, permanent compression set, and rubberiness and are non-toxic, they are used in various fields, for example, for electrical and electric components, various business and office machines, automobiles, airplanes, materials for foods, medical materials, and leisure goods. The application of silicone rubbers is not limited to these static uses and includes many dynamic uses, for example, for rubber contacts of electric calculators and push-button phones, keyboards, uniform rate joint cover boots of automobiles, diaphragms, and medical pump tubings.

However, conventionally known silicone rubbers are not necessarily satisfactory in flex fatigue resistance and extension fatigue resistance particularly in dynamic uses and the flex fatigue resistance and extension fatigue resistance thereof are desired to be improved.

To meet that, also in silicone rubbers, techniques are used that improve the dynamic fatigue resistances of common synthetic rubbers, such as, uniform crosslinking, lowering of crosslink density, lowering of modulus, decreasing of the load of fillers, uniform dispersion of fillers, and elimination of coarse particles of fillers. However, even when these techniques are used, the flex fatigue resistance and extension fatigue resistance of silicone robbers are at the level at most of 1,000,000 times by the most common de Mattia fatigue test method and satisfactory flex fatigue resistance and extension fatigue resistance have not yet been attained in their dynamic uses.

SUMMARY OF THE INVENTION

Therefore, the object of the present invention is to provide a silicone rubber composition whose cured product is remarkably improved in dynamic fatigue resistances such as flex fatigue resistance and extension fatigue resistance.

According to the present invention, there is provided a silicone rubber composition comprising:

(A) a diorganopolysiloxane having the following average composition formula [I]:

$$R_aSiO_{\frac{4-a}{2}} \qquad [I]$$

wherein R's, which may be the same or different, each represent an unsubstituted or substituted monovalent hydrocarbon group having 1 to 10 carbon atoms and a is a number of from 1.95 to 2.05, and possessing an average degree of polymerization in the range of 3,000 to 30,000, (B) a reinforcing filler, (C) an acid strength adjustor, and (D) a curing agent, wherein the extract water pH is in the range of 3.0 to 5.5, said extract water pH being defined in such a way that when 50 g of a toluene solution containing 5.0% by weight of said rubber composition is subjected to extraction with 10 g of deionized water, the pH of the resulting water is defined as the extract water pH.

In conventional silicone rubber compositions, it was considered preferable that the rubber composition is in the neutral state as far as possible in order to maintain the heat resistance of the organopolysiloxane which is a base component and to prevent reversion after the vulcanization.

However, according to the present invention, by adjusting the above-defined extract water pH to the range of 3.0 to 5.5, unexpectedly, properties of vulcanized rubbers are maintained favorably and dynamic fatigue resistances are remarkably improved.

The silicone rubber composition of the present invention is used particularly effectively in the case where the dynamic fatigue of the cured silicone rubber is considered great.

DESCRIPTION OF PREFERRED EMBODIMENTS

(A) Diorganosiloxanes

Figure 1:
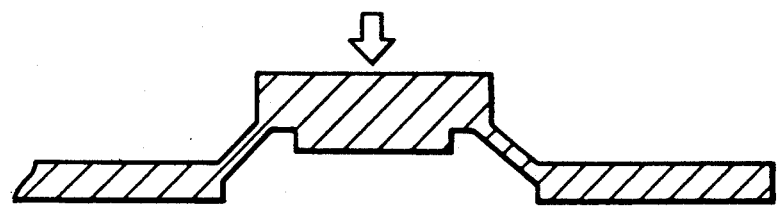
FIG. 1 is a cross-sectional view showing the shape of a rubber contact used for the measurement of durability against striking, etc. in Examples.

The diorganopolysiloxane used as a base component in the present invention is one represented by the following average composition formula [I]:

$$R_aSiO_{\frac{4-a}{2}} \qquad [I]$$

wherein R and a have the same meanings as defined above.

The average composition formula will now be described in more detail. The group R is an unsubstituted or substituted monovalent hydrocarbon group having 1 to 10, preferably 1 to 8, carbon atoms, such as an alkyl group for example a methyl group, an ethyl group, a propyl group, and a butyl group, an alkenyl group for example a vinyl group, an allyl group, and a butenyl group, an aryl group for example a phenyl group and a tolyl group, or a substituted hydrocarbon group formed by substituting one or more of the hydrogen atoms bonded to carbon atoms of the above groups, for example, by a halogen atom(s) or a cyano group(s), e.g., a chloromethyl group, a chloropropyl group, a 3,3,3-trifluoropropyl group, and a 2-cyanoethyl group.

a is a number in the range of 1.95 to 2.05 and R's may be the same or different. Generally, it is preferable that out of all R's, 98 mol % or more are alkyl groups having 1 to 4 carbon atoms and particularly methyl groups. Groups other than these groups are preferably a vinyl group, a phenyl group, and a 3,3,3-trifluoropropyl group.

Preferably the molecular structure of the diorganopolysiloxane is linear, but if the molecular structure contains a branched molecular structure partly, it causes no problem.

The degree of polymerization of the diorganopolysiloxane is in the range of 3,000 to 30,000 and desirably in the range of 4,000 to 10,000 in view of the workability.

(B) Reinforcing Fillers

The reinforcing filler used in the present invention includes, for example, reinforcing fillers conventionally known as fillers for silicone rubbers such as reinforcing silica and more specifically, fumed silica, precipitated silica, and silica aerogel can be exemplified. Preferably they have a specific surface area of at least 50 m²/g in view of the reinforcing action. The surface of the particles of the reinforcing silica may be treated, for example, with a silane, a siloxane, or a silazane containing, for example, a trimethylsilyl group ($(CH_3)_3SiO_{0.5}$), a dimethylsilyl group ($(CH_3)_2SiO$), a monomethylsilyl group ($CH_3SiO_{1.5}$), or a diphenylmethylsilyl group ($(CH_6H_5)_2(CH_3)SiO_{0.5}$).

These reinforcing fillers are blended in an amount of 10 to 100 parts weight, preferably 20 to 70 parts by weight, per 100 parts by weight of the diorganopolysiloxane that is the component (A). If the amount of the reinforcing filler to be blended is less than 10 parts by weight, the reinforcing effect is inadequate whereas if the amount thereof to be blended exceeds 100 parts by weight there is a possibility that the working properties of the rubber composition become unsatisfactory.

(C) Acid Strength Adjustors

In the present composition, in addition to the above components (A) and (B), an acid strength adjustor is blended. The acid strength adjustor is added in order to adjust the extract water pH to the range of 3.0 to 5.5, preferably 3.5 to 4.8.

Common inorganic acids and organic acids can be used as the acid strength adjustor and hydrochloric acid, sulfuric acid, nitric acid, and phosphoric acid as inorganic acids, formic acid, acetic acid, trifluoroacetic acid, and benzoic acid as organic acids can be exemplified. In the present invention, hydrochloric acid and sulfuric acid are preferably used in view of the odor, discoloration, etc.

(D) Curing Agents

The curing agent used in the present invention is a curing agent generally used for curing silicone rubber compositions and specifically an organic peroxide or a combination of an organohydrogenpolysiloxane with a platinum family metal catalyst is used.

Examples of the organic peroxide include benzoyl peroxide, monochlorobenzoyl peroxide, p-methylbenzoyl peroxide, 2,4-dichlorobenzoyl peroxide, t-butyl perbenzoate, dicumyl peroxide, 2,5-bis-(t-butylperoxy)-2,5-dimethylhexane, 2,5-bis-(t-butylperoxy)-2,5-dimethylhexine, dicarbonates such as dimyristylperoxy carbonate and dicyclododecylperoxy dicarbonate, t-butyl monooxycarbonates, and compounds represented by the following formula:

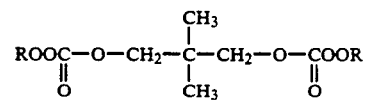

wherein R represents a monovalent hydrocarbon group having 3 to 10 carbon atoms, which may be used singly or as a mixture of two or more of them. Generally these organic peroxides are blended in an amount of 0.5 to 5 parts by weight per 100 parts by weight of the diorganopolysiloxane that is the component (A).

If the diorganopolysiloxane used as the component (A) contains alkenyl groups such as vinyl groups and allyl groups in the molecule, a combination of a platinum family metal catalyst for addition reaction with an organohydrogenpolysiloxane having, in the molecule, two or more silicon-bonded hydrogen atoms additionally reactive with the alkenyl groups can be used as a curing agent.

The platinum family metal catalyst for addition reaction includes, for example, a platinum catalyst, a palladium catalyst, and a rhodium catalyst and a platinum catalyst is preferable. The platinum catalyst includes a catalyst comprising solid platinum carried on a carrier such as platinum black, alumina, or silica, chloroplatinic acid, alcohol-modified chloroplatinic acid, a complex of chloroplatinic acid with an olefin, and a complex of platinum with a vinyl siloxane. These platinum family metal catalysts for addition reaction are blended preferably in an amount of 0.5 to 500 ppm, particularly 2 to 200 ppm, in terms of the platinum family metal based on the diorganopolysiloxane that is the component (A).

As the organohydrogenpolysiloxane, for example, a compound is used that has the following average composition formula [II]:

wherein $R^2$ represents the same substituted or unsubstituted monovalent hydrocarbon group having 1 to 10 carbon atoms as that mentioned for R above, b and c each is a positive number, provided that b+c is 1.0 to 3.0, and has at least two silicon-bonded hydrogen atoms in the molecule.

In the average composition formula [II], preferable examples of the group $R^2$ include an alkyl group such as a methyl group, an ethyl group, a propyl group, and a butyl group and an aryl group such as a phenyl group and a tolyl group.

Desirably the degree of polymerization of the organohydrogenpolysiloxane is 300 or less. Further, the molecular structure may be any of the conventionally known linear structure, cyclic structure and branched structure.

The amount of the organohydrogenpolysiloxane to be blended is preferably in the range of 50 to 300 mol % in terms of the amount of the silicon-bonded hydrogen atoms based on the amount of the alkenyl groups (in terms of the number of mols) of the component (A).

Other Agents to be Blended

In the present silicon rubber composition, in addition to the above-mentioned components (A) to (D), a dispersant such as an alkoxy-group-containing silane, a silanol-group-containing silane, and a low-molecular weight siloxane the degree of polymerization of which is 100 or less, a heat resistance improver such as iron oxide, cerium oxide, iron octylate, and titanium oxide, a pigment for coloring, a fire retardancy auxiliary such as a platinum compound and a palladium compound, and other various additives that will be generally blended in this type of silicone rubber composition can be blended.

The amounts of these agents to be blended may be in the ranges known per se so long as the extract water pH of the silicone rubber composition is in the range mentioned above.

Preparation of the Silicone Rubber Composition

The present silicone rubber composition can be prepared easily by kneading uniformly the prescribed amounts of the above-mentioned components using a kneading machine such as a twin-roll mill, a pressurized kneader, a Banbury mixer, and a continuous kneader.

In this case, it is possible that the acid strength adjustor that is the component (C) is previously adsorbed into the reinforcing filler that is the component (B), and thereafter it is mixed with other components.

In the present invention, it is preferable that the components (A), (B), (C), and, optionally, other components are mixed uniformly, then the mixture is heat-treated, and a curing agent that is the component (D) is mixed therewith. By carrying out such heat treatment, the effect of the addition of the acid strength adjustor that is the component (C) is exhibited well and the dynamic fatigue resistances of the silicone rubber composition are exhibited most effectively. Such heat treatment is preferably carried out at 100 to 200° C. for about 5 minutes to about 4 hours.

Silicone Rubber Compositions

The thus prepared silicone rubber composition is required to have an extract water pH in the range of 3.0 to 5.5, preferably 3.5 to 4.8. If the silicone rubber composition has such an extract water pH, the dynamic fatigue resistances are improved remarkably without impairing the excellent vulcanized rubber properties.

According to the present invention, since the extract water pH is adjusted to the above range by the addition of an acid strength adjustor, it is inferred that the dispersion of the filler in the composition is heightened, the wettability between the organopolysiloxane and the filler particles and between the filler particles is improved, and as a result the dynamic fatigue resistances are improved without impairing the vulcanized rubber properties.

The present silicone rubber composition is employed particularly effectively in the use where dynamic fatigue is very likely to occur, such as rubber contacts of electric calculators and push-button phones, uniform rate joints of automobiles, boots, diaphragms, and medical pump tubings.

EXAMPLES

In the following Examples, "parts" are "parts by weight," and the measurement of various physical properties was carried out as follows.

100 % Extension Fatigue Life

A de Mattia flex fatigue tester (manufacture by Toyo Seiki k.k.) was used, No. 3 dumbbells designated in JIS K6301, 3 were used as test specimens, the run was continued at room temperature and 5 Hz, and the number of cycles at which the test specimen was broken was measured.

Loss Factor

Figure 2:
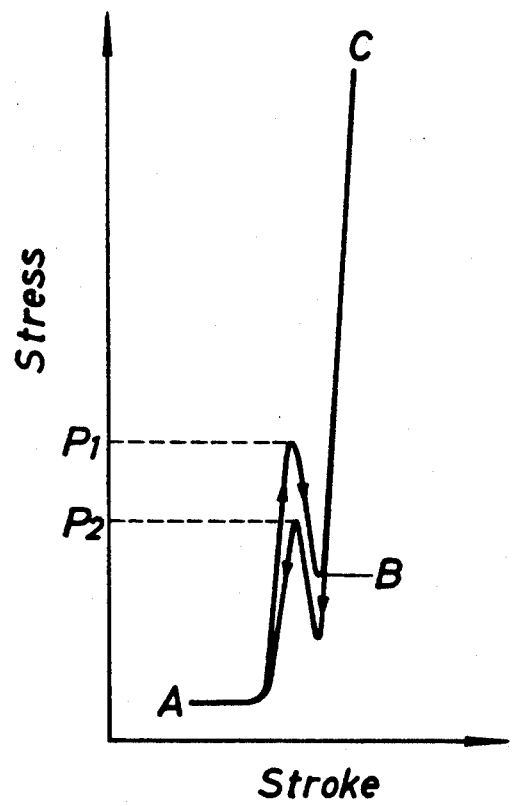
FIG. 2 is a diagram showing the pattern of strokes versus stresses in the striking test of the above rubber contact.

Rubber contacts having the shape shown in FIG. 1 were formed and after the pattern of a stroke versus the stress of a cycle shown in FIG. 2, wherein along the curve in the direction of the arrow the rubber contact in the unloaded state A was brought to the state B where it was forced to be in contact with the substrate and then to the end point C where it was pushed down excessively and then was allowed to be restored to the state A, was repeated 10 times, the quantity defined in the formula given below was measured as a loss factor:

$$\text{Loss factor} = \frac{P_1 - P_2}{P_2} \times 100(\%)$$

Conditions of measurement:
Strokes: 1.5 mm
Speed of striking the key: 10 mm/min

EXAMPLE 1

As the diorganopolysiloxane that is the component (A), a methylvinylpolysiloxane gum end-blocked with $(CH_2=CH)(CH_3)_2SiO_{0.5}$ units comprising 99.85 mol % of a $(CH_3)_2SiO$-unit and 0.15 mol % of a $(CH_3)(CH_2=CH)SiO$ unit and having a degree of polymerization of 7,000 was used.

100 parts of the above methylvinylpolysiloxane gum, 25 parts of fumed silica having a specific surface area of 200 m$^2$/g, 1 part of a dimethylpolysiloxane having a hydroxyl group at its both ends (with a degree of polymerization of 10) as a dispersant, 3 parts of a methylvinylpolysiloxane containing a hydroxyl group at its opposite ends (with a degree of polymerization of 15 and having a vinyl group content of 5 mol % based on the total of the organic groups), and 0.05 part of 1N HCl were mixed uniformly in a kneader and were heat treated at 150° C. for 2 hours to prepare a composition (I).

EXAMPLE 2

Example 1 was repeated, except that, in place of 1N HCl, 1N $H_2SO_4$ was used, thereby preparing a composition (II).

Comparative Example 1

For comparison, Example 1 was repeated, except that 1N HCl was not used at all, thereby preparing a composition (III).

After 0.5 part of 2,5-bis-(t-butylperoxy)-2,5-dimethylhexane was added to each of the compositions (I), (II), and (III), each was press-cured at 170° C. for 10 minutes to prepare sheets having a thickness of 2 mm.

With respect to the obtained sheets, physical properties including the 100 % extension fatigue life were measured. The results are shown in Table 1.

2.5 g of each of the above compositions with which the above organic peroxide had been blended was dissolved in 47.5 g of toluene, and 50 g of each of the thus prepared 5.0 wt. % toluene solutions was subjected to extraction with 10 g of deionized water. The resulting extract water pH was measured. The results also are shown in Table 1.

TABLE 1

|  | Example 1 | Example 2 | Comparative Example 1 |
|---|---|---|---|
| Component (C) | 1N HCl | 1N H$_2$SO$_4$ | not used |
| Extract water pH | 4.2 | 4.5 | 6.0 |
| 100% extension fatigue life (× 10,000 times) | 1,100 | 1,150 | 500 |
| Transparency | very good | very good | good |
| Permanent compression set (180° C./22 hr) | 17% | 15% | 23% |
| Loss factor (%) | 12.2% | 11.1% | 15.0% |
| Hardness (JIS A) | 40 | 41 | 43 |

The permanent compression set was measured in accordance with JIS K 6301. The hardness was measured by a spring type hardness tester A model stipulated in JIS K 6301.

EXAMPLES 3 AND 4 AND COMPARATIVE EXAMPLE 2

Example 1 was repeated, except that the amount of 1N HCl used was changed as shown in Table 2, thereby preparing compositions and sheets therefrom.

With respect to the obtained sheets, physical properties including the 100 % extension fatigue life were measured. The results are shown in Table 2.

TABLE 2

|  | Example 3 | Example 4 | Comparative Example 2 |
|---|---|---|---|
| Amount of 1N HCl | 0.02 | 0.15 | 1.0 |
| Extract water pH | 5.0 | 3.8 | 2.8 |
| 100% extension fatigue life (× 10,000 times) | 1,050 | 950 | Vulcanization was insufficient, and measurement was impossible. |
| Transparency | very good | very good |  |
| Permanent compression set (180° C./22 hr) | 18% | 16% |  |
| Loss factor (%) | 12.3% | 10.7% |  |
| Hardness | 40 | 38 |  |

We claim:

1. A silicone rubber composition comprising:
(A) a diorganopolysiloxane having the following average composition formula [I]:

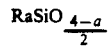

wherein R's which may be the same or different, each represent an unsubstituted or substituted monovalent hydrocarbon group having 1 to 10 carbon atoms and a is a number of from 1.95 to 2.05,
and possessing an average degree of polymerization in the range of 3,000 to 30,000,
(B) a reinforcing filler,
(C) hydrochloric acid or sulfuric acid as an acid strength adjustor, and
(D) a curing agent,
said silicone rubber composition is further characterized such that when 50 g of a tolune solution containing 5.0% by weight of said rubber composition is extracted with 10 g of deionized water forming an organic phase and a water phase, the pH of the water phase thus extracted is in the range of 3.0 to 5.5.

2. A composition as claimed in claim 1, wherein out of all R's in formula [I], 98 mol % or more comprise alkyl groups having 1 to 4 carbon atoms.

3. A composition as claimed in claim 1, wherein the reinforcing filler (B) comprises a reinforcing silica.

4. A composition as claimed in claim 1, wherein the curing agent (D) is an organic peroxide.

5. A composition as claimed in claim 1, wherein the diorganopolysiloxane (A) has an alkenyl group, and the curing agent (D) is a combination of an organohydrogenpolysiloxane and a platinum family metal catalyst.

6. A composition as claimed in claim 1, wherein the reinforcing filler (B) is blended in an amount of 10 to 100 parts by weight per 100 parts by weight of the diorganopolysiloxane (A).

7. A composition as claimed in claim 1, wherein said extract water pH is 3.5 to 4.8.

8. A process for producing a silicone rubber composition as claimed in claim 1 comprising the steps of mixing said diorganopolysiloxane (A), said filler (B), and said acid strength adjustor (C), heat-treating the mixture at 100° to 200 ° C., and mixing said heat-treated mixture with said curing agent (D).

9. A cured product obtained by curing a composition as claimed in claim 1.

* * * * *